(12) United States Patent
Zack

(10) Patent No.: US 11,593,346 B2
(45) Date of Patent: Feb. 28, 2023

(54) CROWDSOURCED VALIDATION OF ELECTRONIC CONTENT

(71) Applicant: Richard K. Zack, Troy, NY (US)

(72) Inventor: Richard K. Zack, Troy, NY (US)

(73) Assignee: Pravado LLC, Geneseo, NY (US)

( * ) Notice: Subject to any disclaimer, the term of this patent is extended or adjusted under 35 U.S.C. 154(b) by 0 days.

(21) Appl. No.: 16/189,911

(22) Filed: Nov. 13, 2018

(65) Prior Publication Data

US 2019/0146965 A1 May 16, 2019

Related U.S. Application Data

(60) Provisional application No. 62/584,220, filed on Nov. 10, 2017.

(51) Int. Cl.
| | | |
|---|---|---|
| *G06F 16/20* | (2019.01) | |
| *G06F 16/23* | (2019.01) | |
| *G06F 16/2457* | (2019.01) | |
| *G06F 16/9535* | (2019.01) | |
| *G06Q 50/00* | (2012.01) | |
| *G06F 16/9536* | (2019.01) | |
| *G06Q 30/0203* | (2023.01) | |
| *G06F 3/0484* | (2022.01) | |

(52) U.S. Cl.
CPC .... *G06F 16/2365* (2019.01); *G06F 16/24578* (2019.01); *G06F 16/9535* (2019.01); *G06F 16/9536* (2019.01); *G06Q 30/0203* (2013.01); *G06Q 50/01* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 6,408,288 B1* | 6/2002 | Ariyoshi | G06F 16/335 706/22 |
| 9,285,973 B1* | 3/2016 | Gable | G06Q 30/0282 |
| 9,330,125 B2* | 5/2016 | Rodriguez | G06F 16/22 |
| 2014/0279043 A1* | 9/2014 | Yi | G06F 40/14 705/14.66 |
| 2016/0189084 A1* | 6/2016 | Galuten | G06Q 10/101 705/7.32 |

OTHER PUBLICATIONS

Cmdrtaco, Moderaton Ideas Sep. 14, 1999, slashdot.org, https://slashdot.org/story/99/09/14/1112201/moderation-ideas.*

(Continued)

*Primary Examiner* — Tarek Chbouki
(74) *Attorney, Agent, or Firm* — Saile Ackerman LLC; Stephen B. Ackerman; Rosemary L. S. Pike

(57) ABSTRACT

Validating electronic content by users includes providing, by a data processing system, electronic content to users, receiving, by the data processing system, the ratings of the electronic content by the at least some of the users based on the rating metric(s), each rating being a raw rating having a default weight, adjusting, by the data processing system, the default weight for each raw rating based on one or more of pre-rating user behaviors, a user rating history and a user credibility rating to arrive at an adjusted rating, using, by the data processing system, the adjusted rating to arrive at a total rating, and providing the total rating to the users.

20 Claims, 13 Drawing Sheets

(56) References Cited

OTHER PUBLICATIONS

CmdrTaco, Slashdot Moderation Sep. 9, 1999, slashdot.org, https://slashdot.org/moderation.shtml.*

Windows 8.1 is available now Oct. 17, 2013, Microsoft, Windows 8.1 is available now, https://news.microsoft.com/2013/10/17/windows-8-1-is-available-now/.*

Liao, Screenshot of Internet Explorer 11 right-click menu Oct. 22, 2020, USPTO, 1 page.*

Yang et al., Arming the public with artificial intelligence to counter social bots Feb. 6, 2019, Human Behavior and Emerging Technologies, arXiv:1901.00912v2.*

Davis et al., BotOrNot: A System to Evaluate Social Bots Apr. 15, 2016, WWW'16 Companion, 273-74.*

FAQ date unknown, iu.edu, https://botometer.osome.iu.edu/faq.*

Botometer: An OSoMe project date unknown [captured on Oct. 18, 2017 by archive.org], Indiana University, https://web.archive.org/web/20171018181328if_/https://botometer.iuni.iu.edu/#!/.*

Sllort, Moderators have lost Moderation Priviledges en masse Jan. 24, 2002, slashdot.org, https://slashdot.org/journal.pl?op=display&uid=442574&id=4236.*

Moderation and Metamoderation date unknown [captured byarchive.org on Sep. 13, 2016], slashdot.org, https://web.archive.org/web/20160913023700/https://slashdot.org/faq/metamod.shtml.*

* cited by examiner

CROWDSOURCED VALIDATION OF ELECTRONIC CONTENT

CROSS-REFERENCE TO RELATED APPLICATIONS

This application claims priority under 35 U.S.C. § 119 to U.S. Provisional Application No. 62/584,220, filed Nov. 10, 2017, which is herein incorporated by reference in its entirety.

BACKGROUND INFORMATION

In modern times, it has become difficult to know whether an online news story, article, photograph, video, podcast, livestream, live video broadcast, or other content is real, or accurate, or credible, or trustworthy. For example, some items can be "click bait," fake news, misinformation, disinformation, satire, or have a political bias. This of course causes a loss of trust in the sources of information. In one study by The Pew Research Center, 98 million U.S. adults often read news online. Another study from Harvard-Harris shows that 84 percent of U.S. voters say it is sometimes difficult to know what is true online, 75 percent of the public have believed a fake news story online and 23 percent admit to sharing a fake news story.

Presently, independent fact-checking of news and content (outside of the news and content publishers themselves) is done either (a) using a closed-door fact checking process where a small number of individuals employed by private firms independently determine and score veracity, or (b) using artificial intelligence algorithms to score veracity based on contextual and other algorithmic analysis.

The problem with closed-door fact checking processes is that inherent bias from the small number of fact-checkers cannot be easily determined, and often falls short under public scrutiny. Large segments of the public do not trust private, closed-door fact-checkers. It is also impossible to quickly scale closed-door fact-checking to handle all questionable content at the pace at which it is presently created.

SUMMARY OF THE INVENTION

The shortcomings of the prior art are overcome and additional advantages are provided through the provision, in one aspect, of a computer-implemented method of validating electronic content. The method comprises: providing electronic content to a plurality of users rating the electronic content by at least some of the plurality of users; receiving, by the data processing system, the ratings of the electronic content from the at least some users of the plurality of users based on the one or more rating metrics, each rating being a raw rating having a default weight; and adjusting, by the data processing system, the default weight for each raw rating based on one or more of pre-rating user behaviors, a user rating history and a user credibility rating to arrive at an adjusted rating. The method further comprises using, by the data processing system, the adjusted rating to arrive at a total rating and making the total rating available to the plurality of users and one or more of the raw ratings and one or more of the adjusted ratings.

In accordance with another aspect, a computer-implemented method of rating users that are rating electronic content is provided. The method comprises providing electronic content to a user for rating by the user, the rating being based on one or more ratings metrics. The method further comprises adjusting, by the data processing system, a pre-existing or default user rating for the user based on at least one of: (a) one or more behaviors of the user prior to rating the electronic content, the one or more behaviors being tracked; (b) a rating history of the user; and (c) one or more user credibility factors.

In accordance with yet another aspect, a computer-implemented method is provided. The method comprises: receiving, by a data processing system, a raw rating from a user for electronic content based on one or more rating metrics; querying, by the data processing system, a database for a rating history for the user, wherein the data processing system comprises a data processing system in communication with a memory storing instructions for assisting the user in rating the electronic content; based on a number, type and content of ratings for the user, determining, by the data processing system, a user bias; based on prior user ratings, determining, by the data processing system, an article bias; based on the article bias, comparing, by the data processing system, the user bias and the article bias; determining, by the data processing system, a weight for the user based on user behavior; adjusting, by the data processing system, the weight based on a comparison of the user bias and the article bias; and storing, by the data processing system, the weight in a database.

In accordance with still yet another aspect, a system for validating electronic content is provided. The system comprises at least one processor, and a memory in communication with the processor(s), the memory storing instructions to assist a user in performing a method of validating electronic content, the method comprising: providing, by a data processing system comprising the at least one processor and the memory, electronic content to a plurality of users rating the electronic content by at least some of the plurality of users; receiving, by the data processing system, the ratings of the electronic content from the at least some users of the plurality of users based on the one or more rating metrics, each rating being a raw rating having a default weight; adjusting, by the data processing system, the default weight for each raw rating based on one or more of pre-rating user behaviors, a user rating history and a user credibility rating to arrive at an adjusted rating; using, by the data processing system, the adjusted rating to arrive at a total rating; and providing the total rating to the plurality of users.

Additional features and advantages of this invention will become apparent from the following detailed description of the various aspects of the invention taken in conjunction with the accompanying drawings.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION OF THE INVENTION

Figure 1:
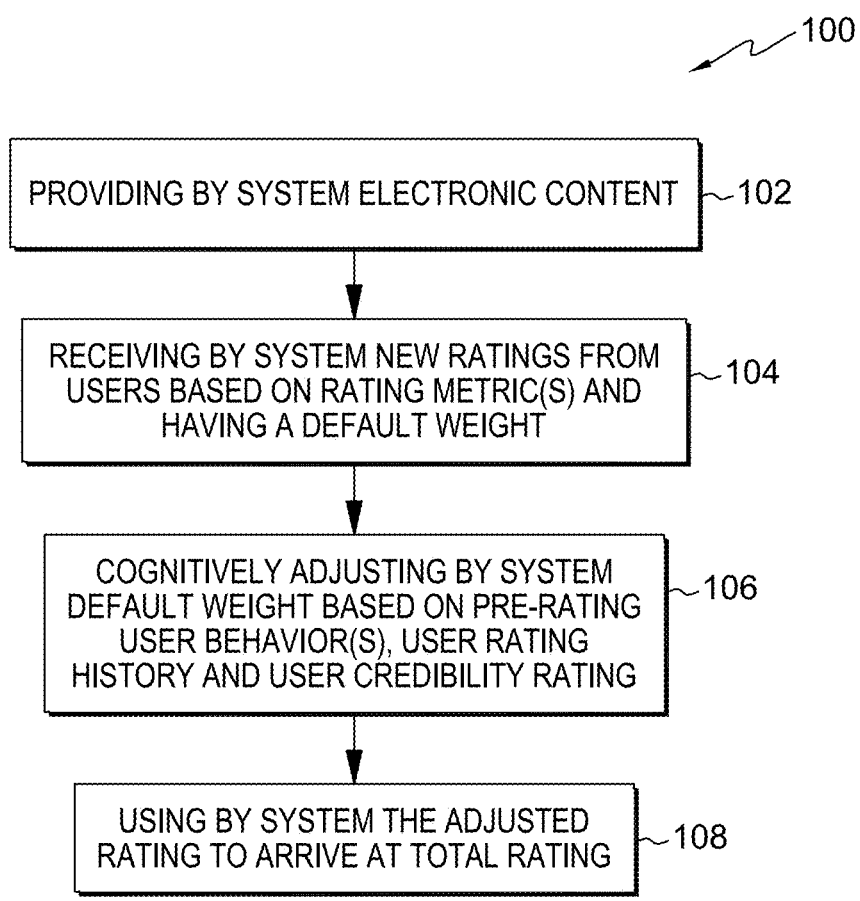
FIG. 1 is a flow diagram of one example of enabling electronic content fact checking and validation, in accordance with one or more aspects of the present application.

The present application generally relates to methods and system for providing background information and context and validating one or more aspects of written, photographic, videographic, imagery, or other electronic content. More particularly, the present application relates to methods and system for crowdsourced validation of one or more aspects of written photographic, videographic, imagery, or other electronic content.

Aspects of the present application and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As will be appreciated by one skilled in the art, aspects of the present application may be embodied as a system, method or computer program product.

Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable storage medium(s) having computer readable program code embodied thereon.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the exemplary term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As used herein, the term "spin" refers to a political bias, including "left" spin, referring to a relatively liberal bias, and "right" spin, referring to a relatively conservative bias.

The term "trust" used herein refers to the belief in the reliability or credibility of author(s) and/or publisher(s) of the electronic content being reviewed by users reviewing the same.

The term "accuracy" used herein with respect to electronic content refers to the accuracy of electronic content as a whole and/or individual facts identified by users reviewing the same.

The term "relevance" used herein with respect to electronic content refers to a categorization as to the type of electronic content, such as, for example, click bait, opinion, not news or fake news, real news, satire or other type specified by a reviewing user. As used herein, the term "click bait" refers to electronic content with a provocative title and/or no "real" content, designed primarily to get the user to click on it, resulting in a barrage of advertising or other targeted information that may be intentionally difficult to get away from, and/or content that is misleading.

As used herein, the term 'STAR metrics" refers to a combination of rating metrics, for example, spin, trust, accuracy and relevance, as defined herein.

"Liberal" politically means a person who believes that government should be active in supporting social and political change, and/or is open to new behavior or opinions and willing to discard traditional values, or any part or combination thereof;

"Conservative" (adjective) refers to one holding traditional attitudes and values and is cautious about change or innovation, for example, in relation to politics or religion.

"Conservative" (noun) refers to a one who is adverse to change and holds to traditional values and attitudes, for example, in relation to politics.

As used herein, the term "public user" is a subset of "user(s)" and refers to any person submitting a review of electronic content that is not designated by the provider of the service as an expert user.

As used herein, the term "expert user" is a subset of "user(s)" and refers to a person submitting a review of electronic content with sufficient credentials to be designated as such. Expert users differ from public users by at least one characteristic based on knowledge, experience, credentials or education. Non-limiting examples of what may be considered to be sufficient credentials include a relevant degree, years of experience in a given field, established reputation in a given field that is recognized nationally or internationally and established ratings history within the ratings system.

As used herein, the term "user ratings history" refers to prior submissions of a reviewer of electronic content.

As used herein, the term "user credibility" refers to action(s) taken by a reviewer of electronic content that increase the likelihood the reviewer is a real human being and not an automated robot or other system or a fake user account. Non-limiting examples of such actions include uploading a profile picture, allowing other users to see a real name (versus user name), verifying a phone number provided, linking social media account(s), verifying a physical address provided, providing a government issued ID, passing a media literacy quiz, and verifying an education background. Media Literacy is the ability to access, analyze, evaluate and create media in a variety of forms.

As used herein, the term "click" refers to selecting by a user, a graphical icon, swiping action, tap, or textual link to take some action, for example, a graphical sliding scale for a user to choose a percentage for rating one or more aspects of electronic content, or for example, a set of provided icons for a user to choose a specified ratings value, or for example, the ability to on mobile devices to use a combination of swiping actions and directions to indicate particular ratings, i.e., up=true, down=false, left=left spin, right=right spin.

As used herein, the term "ideology" refers to a system of political ideas, ideals and beliefs held by a person, group or society.

As used herein, the term "pre-rating user behavior" refers to actions taken or not taken by a user prior to reviewing electronic content indicative of actual interest in the content and time spent fact-checking the electronic content. Non-limiting examples of pre-rating user behavior includes whether the user clicked on the content, how much time the user spent with the content, whether the user clicked on source or related content, how much time the user spent with the source or related content, and whether the user submitted any sources supporting or not supporting a portion or more of the content.

As used herein, the term "electronic content" refers to any information published or otherwise made public by the provider of the service or the user reviewing the information, that is available in electronic form. Where present and available in electronic form, the term "electronic content" also includes supporting background information about one or more of the electronic content, a publisher of electronic content, an author of the electronic content and any sources for the electronic content. Non-limiting examples of electronic content include news articles, statements, photographs, videos, images, podcasts, livestreams, live video broadcasts, reviews, papers, books, short stories, commentary (e.g., "op-ed" pieces), announcements, press releases, speeches and information in any language, and translations thereof.

As used herein, the term "user bias" refers to the tendency of a user, based on their user ratings history, to rate electronic content as accurate or inaccurate, or trustworthy or not trustworthy, or real or fake or clickbait or opinion, based primarily on their own political ideology. In one example, the user bias may be calculated based on several factors, including (a) the pre-rating user behaviors; and (b) the users ratings when compared to a plurality of other user ratings for the same electronic content. For example, if a user consistently rates content as false and with a liberal spin, that a plurality of other users has rated as true, this could indicate a conservative user bias. The system can automatically calculate a percentage estimate of user bias for all users based on their user ratings history and the user ratings history of all other users who have rated content.

As used herein, the term "article bias" refers to aggregate, weighted political spin ratings from a plurality of users for rated electronic content. For example, if a plurality of weighted political spin ratings on any electronic content indicate the content has a left political spin, the determined article bias may be a calculated percentage representing a liberal bias (such as 67% liberal bias, for example).

FIG. 1 is a flow diagram 100 of one high-level example of a method of validating electronic content, in accordance with one or more aspects of the present application. The method includes providing 102, by a data processing system, electronic content to users for rating the electronic content based on one or more rating metrics. In one embodiment, the electronic content may be provided via an interactive rating graphical user interface (GUI) stored in a memory of the data processing system in communication with a data processing system of the data processing system. In another embodiment, the electronic content may be served to the user, for example, using an Application Programming Interface (API) associated with a server of the electronic content. The API receives a request for electronic content from a user, for example, via a Web page, and responds with the electronic content provided by the server. The method further includes receiving 104, by the data processing system, a rating of the electronic content by at least some users of the users via the interactive rating GUI based on the rating metric(s), each rating being a raw rating having a default weight, and adjusting 106, by the data processing system, the default weight for each raw rating based on pre-rating user behavior(s), a user rating history and a user credibility rating to arrive at an adjusted rating. The data processing system then uses 108 the adjusted rating to arrive at a total rating. The total rating represents the public opinion consensus with regard to the rated electronic content.

Figure 2:
FIG. 2 is one example of providing an interactive rating graphical user interface (GUI), in accordance with one or more aspects of the present application.

FIG. 2 depicts one example of a screen a user may see while accessing new electronic content, in accordance with one or more aspects of the present application. In this example, text of a news story 202 involving the Food and Drug administration (FDA) is shown. Also shown is a "rate this article" button 204 for the user to select in order to rate the article. Also shown in FIG. 2 is an example of information 206 regarding the article and a current rating therefor.

Figure 3:
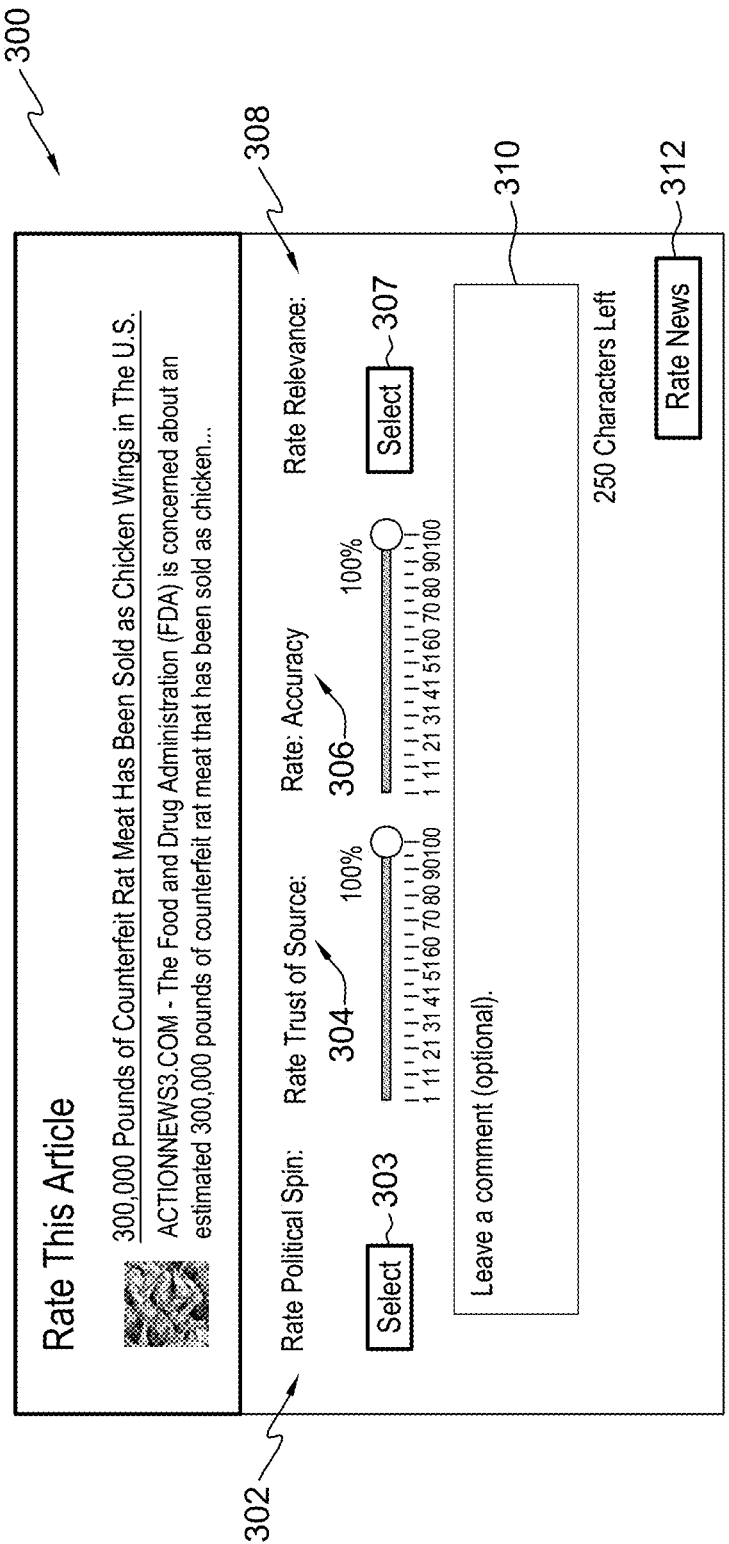
FIG. 3 is one example of rating metrics for providing an interactive rating GUI by the user, in accordance with one or more aspects of the present application.

As shown in FIG. 3, in response to selecting button 204 in FIG. 2, a rating screen 300 results, in accordance with one or more aspects of the present application. The rating screen allows the user to rate the article based on one or more of spin 302, trust of the source 304, accuracy 306 and relevance 308. While trust and accuracy can be rated, in this example, using a slider, for spin and relevance, buttons 303 and 307 are used, respectively, that invoke drop-down boxes, which from there, the user can select their rating for those factors. To submit the rating, the user selects the "rate news" button 312. Note that not all four metrics need be accessed by the user; one or any combination of the metrics can be rated; and other ratings metrics may be added in the future.

Figure 4:
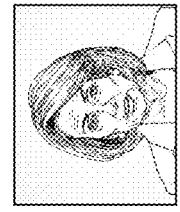
FIG. 4 is one example of a social news network, in accordance with one or more aspects of the present application.

FIG. 4 depicts one example of a screen showing recent news (e.g., article 402) and statistics (e.g., statistics 404) regarding the rating metrics, in accordance with one or more aspects of the present application. The statistics may include, for example, the aggregate calculation of weighted user ratings for various metrics, including, for example, "right spin," trust (percentage determination of trusted or distrusted), accuracy (percentage determination of true or false), and relevance (percentage determination of real, fake, clickbait, satire, opinion, not news, or other relevance metrics). In one example, the statistics may be continually updated as raw ratings come in from users. In another example, the statistics may be periodically updated. Also shown in FIG. 4 is list 406 of the current top ten most rated false stories and a list 408 of the current top ten rated news stories by numbers of users rating a given story.

Figure 5:
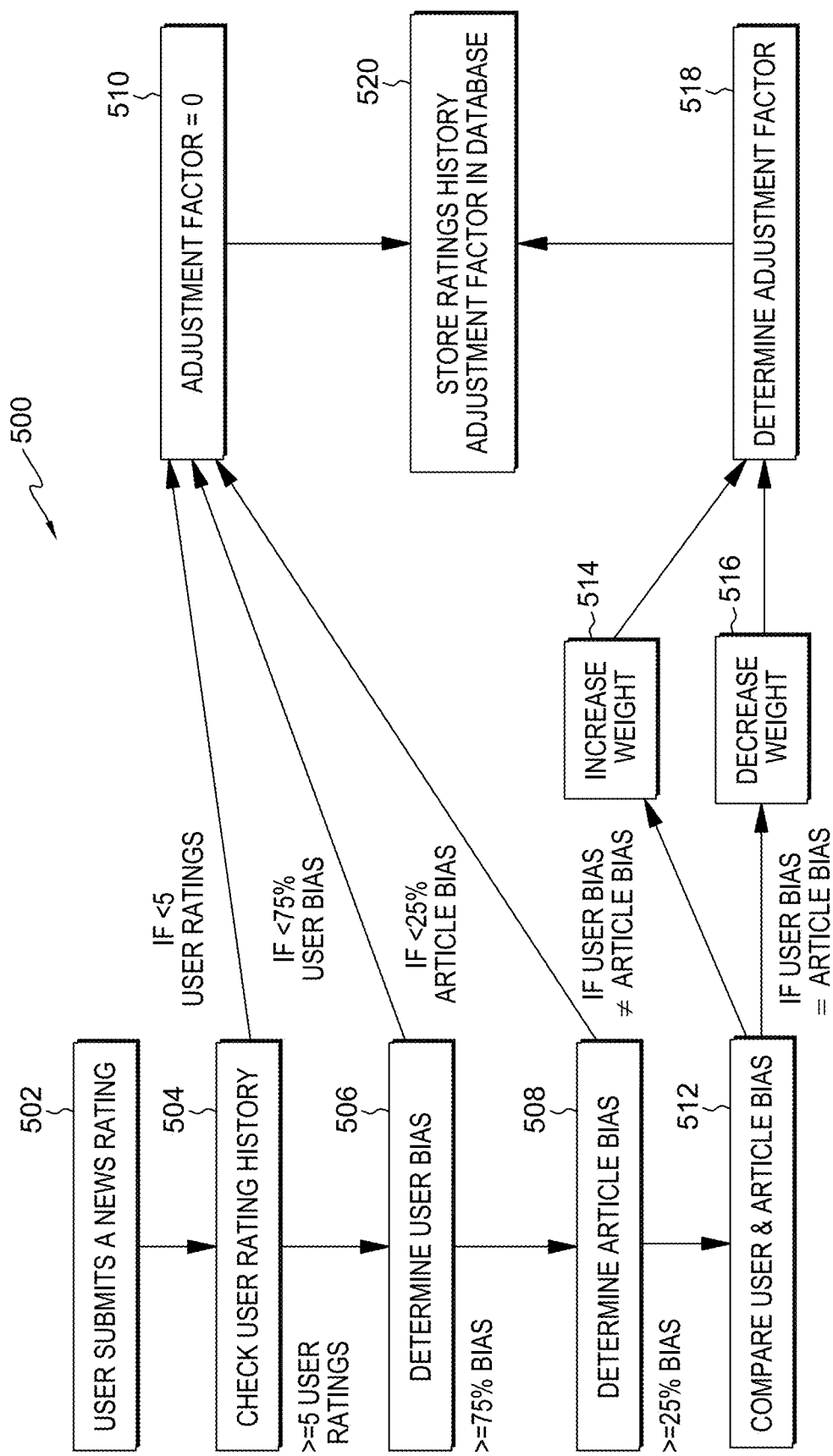
FIG. 5 is a flow diagram for one example of determining a user rating adjustment based on a history of ratings by the user, in accordance with one or more aspects of the present application.

FIG. 5 is a flow diagram 500 for one example of determining a user rating adjustment based on a history of ratings by the user. It begins with a user submitting a rating for electronic content 502, which triggers a database query for a rating history of the user 504. If there is no user rating or if a number of user ratings is less than a predetermined number (e.g., five ratings), then the adjustment factor is set to zero 510. Otherwise, if the number of user ratings is acceptable (e.g., five or more), then a user bias is determined 506, as described above. If the determined article bias is less than a predetermined percentage (e.g., less than or equal to 75 percent), then the adjustment factor is set to zero 510. Otherwise, if the determined article bias is acceptable (e.g., 25 percent or more), then the determined user bias and the determined article bias are compared 512. If the determined user and article biases are not equal, then the weight attributed to the ratings history of the user is increased 514 (e.g., from 0.001 to 1000.000), but if equal, the weight is decreased 516 (e.g., from −0.001 to −1000.00). After the weight is adjusted up or down, an adjustment factor (i.e., the weight) is determined 518. Finally, once an adjustment factor for a user rating history is determined (510 or 518), it may be stored 520, for example, in a database.

Figure 6:
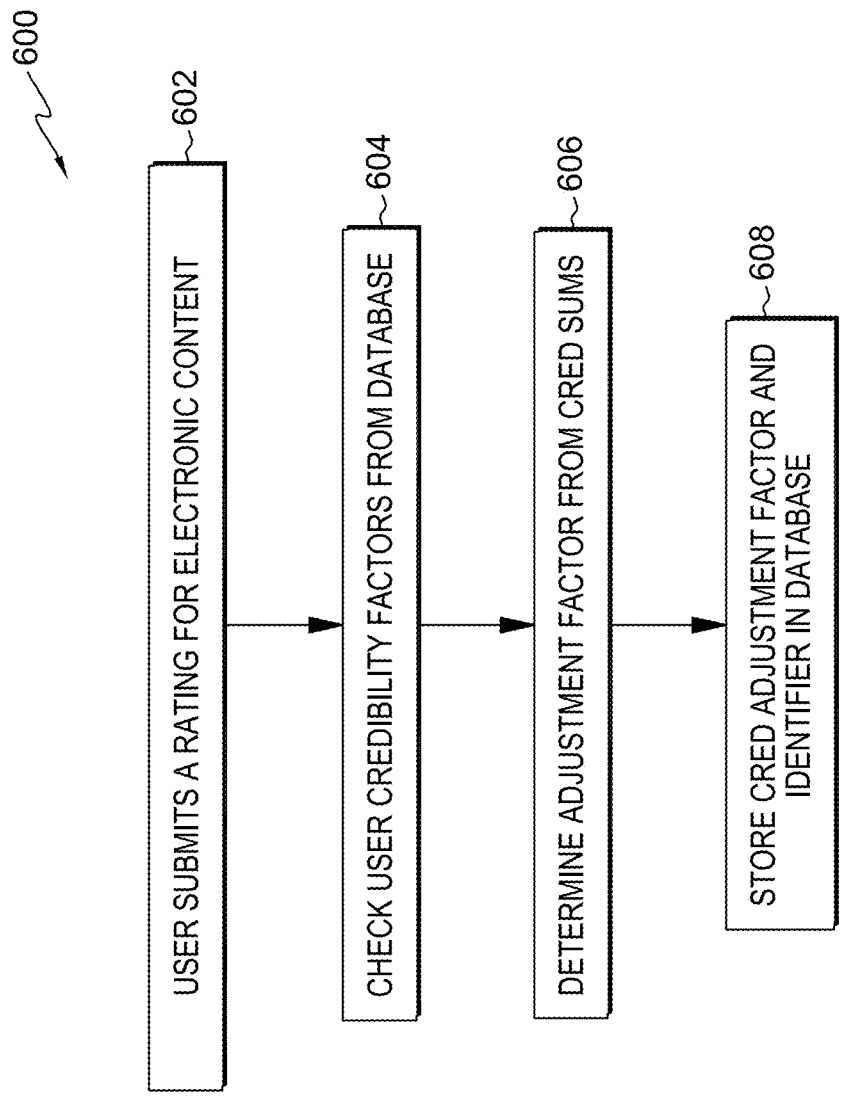
FIG. 6 is a flow diagram of one example of weight adjustment process of weight adjustments for user credibility, in accordance with one or more aspects of the present application.

FIG. 6 is a flow diagram 600 of one example of the weight adjustment process, in accordance with one or more aspects of the present application. The process begins when a user submits 602 a rating for electronic content, which triggers a check 604 of the user's credibility factors, which may, for example, be stored in a database. In one example, the sum of the user's credibility factors provides a raw credibility score. An adjustment factor may be determined 606, based on the raw credibility score. For example, if the user credibility score is 300, the rating value will be multiplied by 300, and that value stored in the database and associated with that user, rating, and content.

Figure 7:
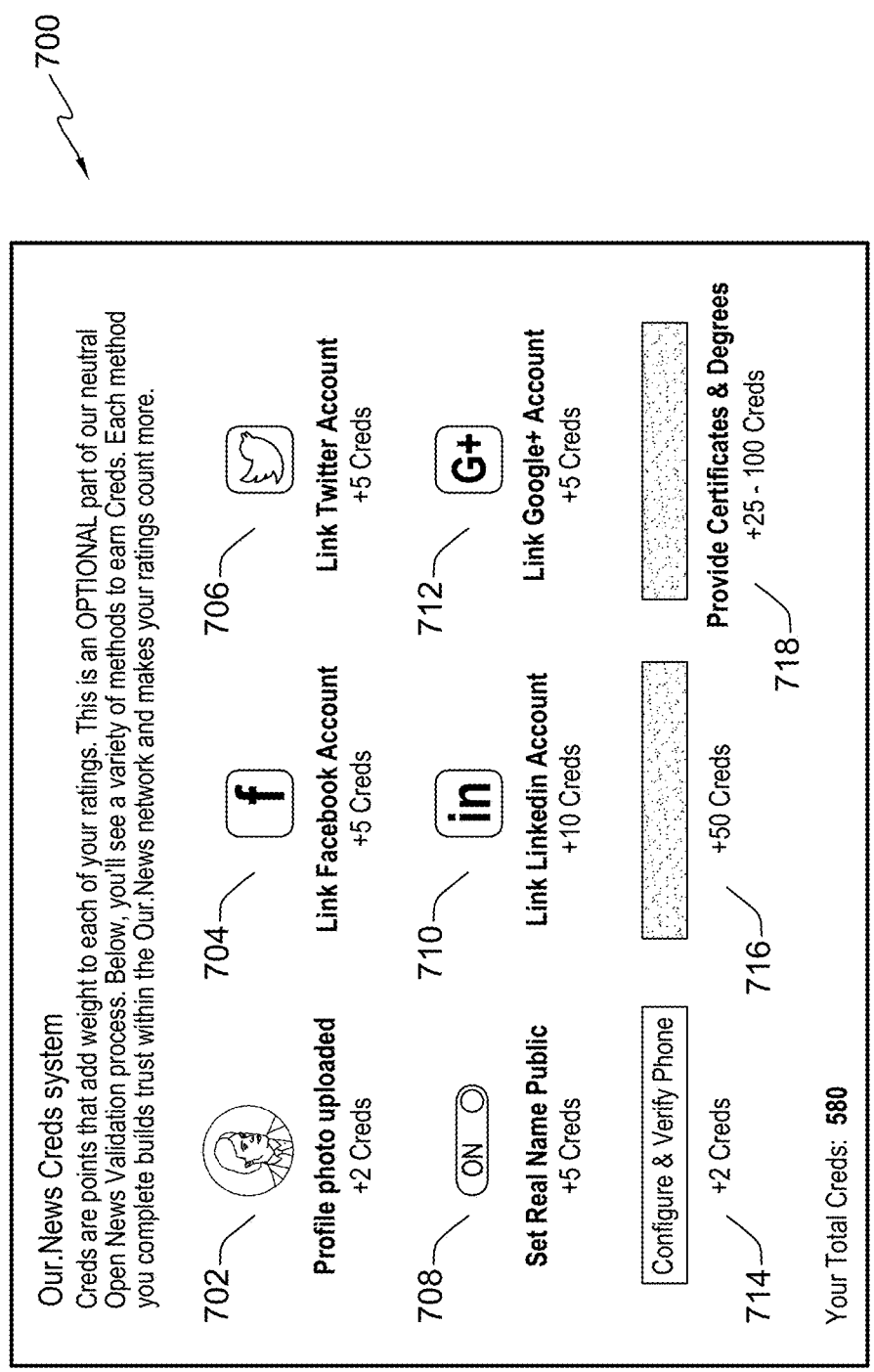
FIG. 7 is one example user credentials verification system using weighted ratings, in accordance with one or more aspects of the present application.

FIG. 7 depicts one example of a screen 700 a user may see for verification of credentials. The screen may include, for example, a number of tiles, each of which relates to a type of verification, for example, a tile 702 for a profile photograph that the user has uploaded. Tiles are just one example of a screen layout for verification of credentials. For instance, it could be a simple list with links, different shaped tiles or other design to convey the information, or controlled via an application program interface (API). Tile 704 depicts an icon for a first social media account of the user that could be linked to the system. Tile 706 shows another social media account of the user that may be linked to the system. Tile 708 includes an on/off button for whether the user has provided or will provide their real name to be public among users and/or to the general public. Tile 710 shows a business social media account that has been linked to the news system. Tile 712 depicts another social platform that has been linked to the news program. Tile 714 shows a button 715 where the user can configure and verify their phone number. Tile 716 is an optional media literacy quiz that the user could take, which could increase their credibility rating. Media Literacy is the ability to access, analyze, evaluate and create media in a variety of forms. Finally, tile 718 shows that a user could provide certificates and degrees to verify their education.

Figure 8:
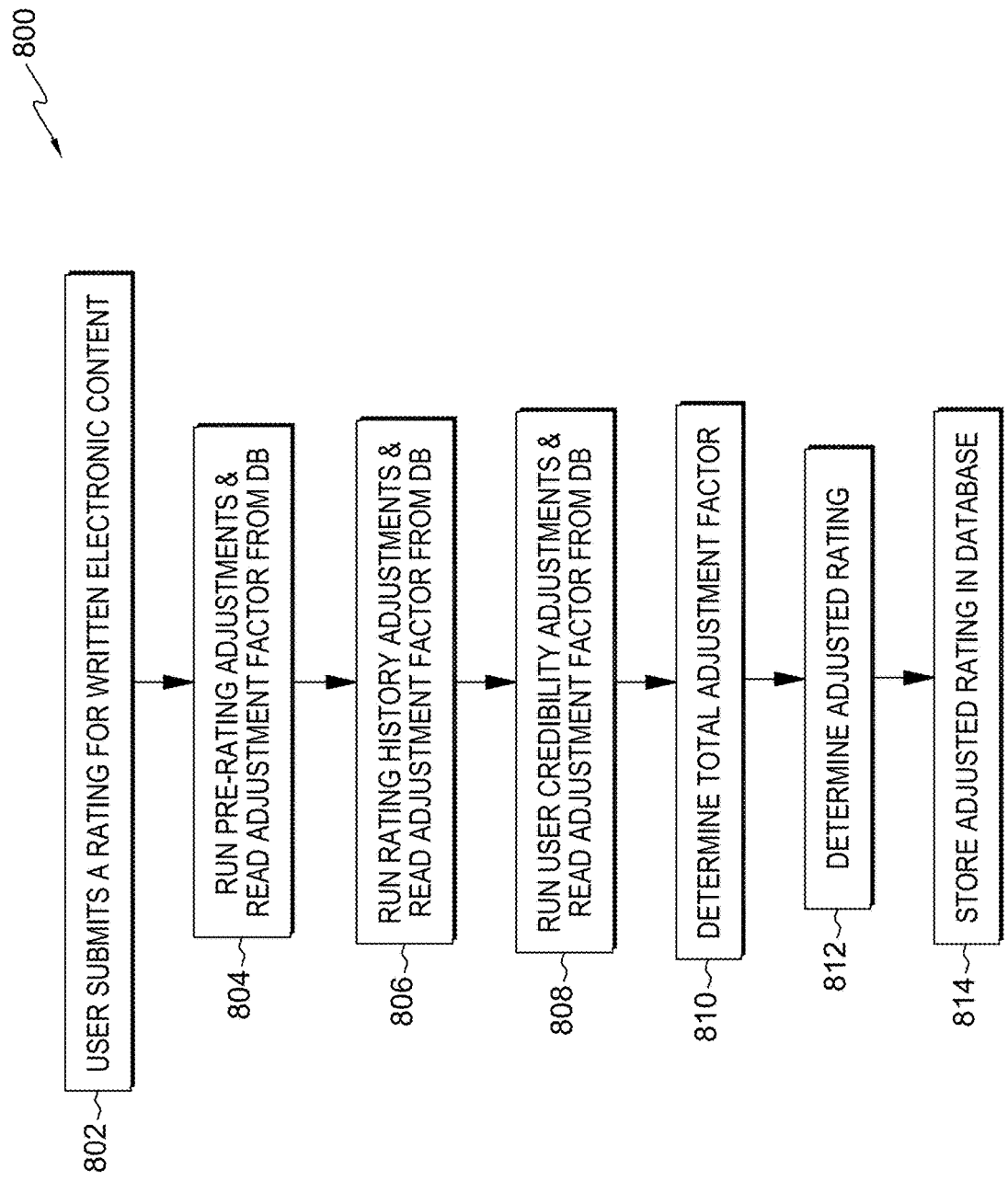
FIG. 8 is a flow diagram of one example of a weight adjustment process showing the application of pre-rating adjustments, history and credential weights to user ratings, in accordance with one or more aspects of the present application.

FIG. 8 is a flow diagram 800 for one example of a weight adjustment process to apply pre-rating, rating history and credential weights to a user rating. The process begins when a user submits 802 a rating for electronic content. As noted with regard to FIG. 1, in one embodiment, the ratings may be submitted using a GUI or via API/server. The submission causes the system to run 804 pre-rating adjustments and read a first adjustment factor for the user from a database. The system then runs 806 rating history adjustments and reads a second adjustment factor, different than the first adjustment factor, for the user from the database. The system next runs 808 user credibility adjustments and reads a third adjustment factor, different than the second and first adjustment factors, for the user from the database. A total adjustment factor is then determined 810 by combining these first three adjustment factors. The total adjustment factor may then be used by the system to determine 812 an adjusted rating for the user. In one example, the adjusted rating may be determined by multiplying the total adjustment factor by the raw rating. The adjusted rating may then be stored 814 in the database.

Figure 9:
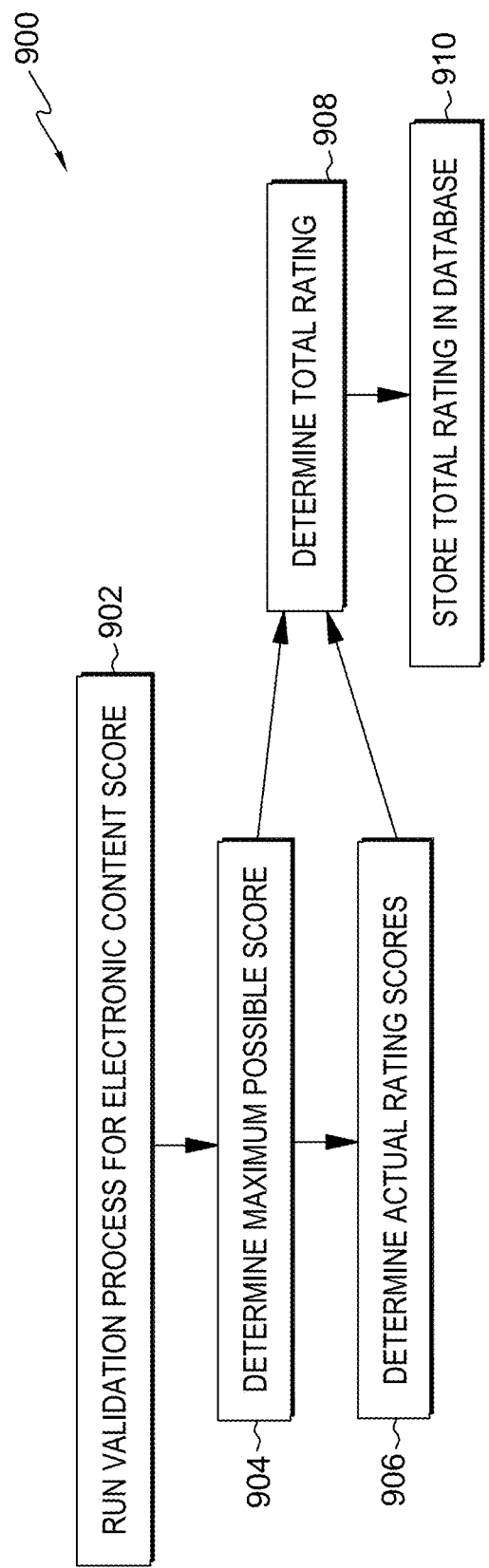
FIG. 9 is a flow diagram of one example of an electronic content scoring process, in accordance with one or more aspects of the present application.

FIG. 9 depicts a flow diagram 900 for one example of a process to validate a score for electronic content. The process begins when a new user rating of electronic content (e.g., a news article, photo, video, podcast, live broadcast, etc.) is received by the system. Validating an electronic content score may also be run at periodic intervals to re-validate, whether or not a rating is received from the user. The system determines 904 a maximum possible score for the user. In one example, the maximum possible score may be determined by summing all user ratings for a user and multiply by 100. Actual rating scores for the user may then be determined 906 by the system. In one example, this may be accomplished by summing all adjusted ratings for the user, which may be stored in a database. A total rating for the user may then be determined 908. In one example, the total rating may be determined by dividing the actual scores by the maximum possible scores. The total rating may then be stored 910 by the system in a database.

In a first aspect, disclosed above is a computer-implemented method of validating electronic content. The computer-implemented method includes providing, by a data processing system, electronic content to a plurality of users for rating the electronic content based on rating metric(s); receiving, by the data processing system, the ratings of the electronic content from the at least some users of the plurality of users based on the rating metric(s), each rating being a raw rating having a default weight; adjusting, by the data processing system, the default weight for each raw rating based on one or more of pre-rating user behavior(s), a user rating history and a user credibility rating to arrive at an adjusted rating; using, by the data processing system, the adjusted rating to arrive at a total rating; and making the total rating available to the plurality of users and one or more of each raw ratings for the at least some of the users of the plurality of users and one or more of each adjusted ratings for the at least some of the users of the plurality of users.

In one example, the using may include, for example: determining, by the data processing system, a maximum possible rating for the electronic content; adding up, by the data processing system, all adjusted ratings and dividing by the maximum possible rating to arrive at a total rating; and storing, by the data processing system, the total rating in a database.

In one example, the rating metric(s) in the computer-implemented method of the first aspect may include, for example, at least one of spin, trust, accuracy and relevance.

In one example, the pre-rating user behavior(s) in the computer-implemented method of the first aspect may include, for example, at least one of: whether a given user has opened the electronic content; a length of time the given user spent reading the electronic content; whether the given user clicked on any source or related electronic content; and a length of time the given user spent reading the any source or related electronic content.

In one example, the pre-rating user behavior(s) in the computer-implemented method of the first aspect may include, for example, whether a given user submitted any source related to the electronic content.

In one example, the electronic content in the computer-implemented method of the first aspect may, for example, correlate to an ideology, and the user rating history may include, for example, a frequency of rating the ideology as one of true, false, left spin, right spin, trusted, distrusted, real, misleading, out of context, racial bias, non-sequitur, logical fallacy, speculation, generalization, misused, misinterpreted, sensational, doctored photo, doctored video and clickbait.

In one example, the user credibility rating in the computer-implemented method of the first aspect may include, for example, at least one of uploading a profile photo of the user, linking social media account(s) of the user, allowing the public to see a real name of the user, verifying a phone number of the user, verifying the mailing address of the user, verifying the government issued ID of the user, and verifying an education of the user.

In one example, the computer-implemented method of the first aspect may include, for example, displaying the total rating when the electronic content is open; and updating the total rating as additional ratings for the electronic content are received.

In a second aspect, disclosed above is a computer-implemented method of rating users while the users are rating electronic content. The computer-implemented method includes providing electronic content to a user for rating by the user, the rating being based on rating metric(s); adjusting, by the data processing system, a preexisting or default user rating for the user based on at least one of: (a) behavior(s) of the user prior to rating the electronic content, the behavior(s) being tracked; (b) a rating history of the user; and (c) user credibility factor(s).

In one example, rating metric(s) may include, for example, at least one of spin, trust, accuracy and relevance.

In one example, the pre-rating user behavior(s) in the computer-implemented method of the second aspect may include, for example, at least one of: whether a given user opened the profile of the user being rated; a length of time the given user spent reading that profile; whether the given user clicked on any background links of the profile; a length of time the given user spent reading any background links of the profile or related electronic content; whether the given user submitted any source containing information relevant to the user being rated; whether the given user is connected with the user being rated on any social network or media platform; whether the given user has an identified political bias or ideology that matches or is opposite to the identified political bias or ideology of the user being rated; and the frequency that any given user has rated other users negatively or positively, whether or not based on political bias or ideology or other factors.

In one example, the electronic content in the computer-implemented method of the second aspect may, for example, correlate to an ideology, and the user rating history may include, for example, a frequency of rating the ideology as any of false, true, trusted and distrusted.

In one example, the user credibility rating in the computer-implemented method of the second aspect may include, for example, at least one of uploading a profile photo of the user, linking social media account(s) of the user, allowing the public to see a real name of the user, verifying a phone number of the user, verifying a physical mailing address of the user, verifying a government issued ID of the user, and verifying an education of the user.

In a third aspect, disclosed above is a computer-implemented method. The computer-implemented method includes: receiving, by a data processing system, a raw rating from a user for electronic content based on rating metric(s); querying, by the data processing system, a database for a rating history for the user, the data processing system including a data processing system in communication with a memory storing instructions for assisting the user in rating the electronic content; based on a number, type, and content of ratings for the user, determining, by the data processing system, a user bias; based on prior user ratings, determining, by the data processing system, an article bias; based on the article bias, comparing, by the data processing system, the user bias and the article bias; determining, by the data processing system, a weight for the user based on user behavior; increasing, by the data processing system, the weight based on a comparison of the user bias and the article bias; decreasing, by the data processing system, the weight based on a comparison of the user bias and the article bias, and storing, by the data processing system, the weight in a database.

In a fourth aspect, disclosed above is a system for validating electronic content. The system includes: at least one processor; and a memory in communication with the processor(s), the memory storing instructions for implementing a method of validating electronic content. The method includes: providing, by a data processing system, electronic content to a plurality of users rating the electronic content from at least some of the plurality of users; receiving, by the data processing system, the ratings of the electronic content from the at least some users of the plurality of users based on the rating metric(s), each rating being a raw rating having a default weight; adjusting, by the data processing system, the default weight for each raw rating based on one or more of pre-rating user behavior(s), a user rating history and a user credibility rating to arrive at an adjusted rating; using, by the data processing system, the adjusted rating to arrive at a total rating; and making available to the plurality of users the total rating and one or more of each raw rating for the at least some of the users of the plurality of users and each adjusted rating for the at least some of the users of the plurality of users.

In one example, the rating metric(s) may include, for example, at least one of spin, trust, accuracy and relevance.

In one example, the pre-rating user behavior(s) of the system of the fourth aspect may include, for example, at least one of: whether a given user has opened the electronic content; a length of time the given user spent reading the electronic content; whether a given user clicked on any source or related electronic content; and a length of time the given user spent reading the any source or related electronic content.

In one example, the pre-rating user behavior(s) of the system of the fourth aspect may include, for example, whether a given user of the at least some users submitted any source to the electronic content.

In one example, the electronic content of the system of the fourth aspect correlates to an ideology, and the user rating history may include, for example, a frequency of rating the ideology as one of true, false, left spin, right spin, trusted, distrusted, real, misleading, out of context, racial bias, non-sequitur, logical fallacy, speculation, generalization, misused, misinterpreted, sensational, doctored photo, doctored video and clickbait.

In one example, the user credibility rating of the system of the fourth aspect may include, for example, at least one of uploading a profile photo of the user, linking social media account(s) of the user, allowing the public to see a real name of the user, verifying a phone number of the user, verifying a physical mailing address of the user, verifying a government issued ID of the user, and verifying an education of the user.

Determining the aggregate rating scores of authors, editors, and publishers of electronic content based on the aggregate, adjusted user ratings of all content associated with them, wherein all ratings of all content associated with each entity are added together and then divided by the total number of content items, to provide aggregate scores for spin, trust, accuracy, relevance, for each author, editor, and publisher.

As used herein, the term "cognitively adjusting" refers to the use of cognitive computing in adjusting a default weight for a rating of electronic content by a user based on pre-rating user behaviors, a rating history for the user and/or a credibility rating for the user. "Cognitive computing" is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

In one example, a cognitive computer system performs the cognitive-adjusting. The cognitive computer system may include hardware and/or software that mimics the functioning of the human brain and helps to improve human decision-making, which can be further improved using machine learning.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other data processing systems, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

In one embodiment, for any information needed to be understood from text, for example, text regarding electronic content, Natural Language Understanding (previously known as Natural Language Processing) and Natural Language Classification can be used.

The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, APIs (Application Programming Interfaces) for a natural language understanding service and, e.g., a JAVA® application, one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining a natural language classifier service with a conversation service if one wants their application to engage in a conversation with a user; and classifying frequently asked questions (FAQs).

Figure 13:
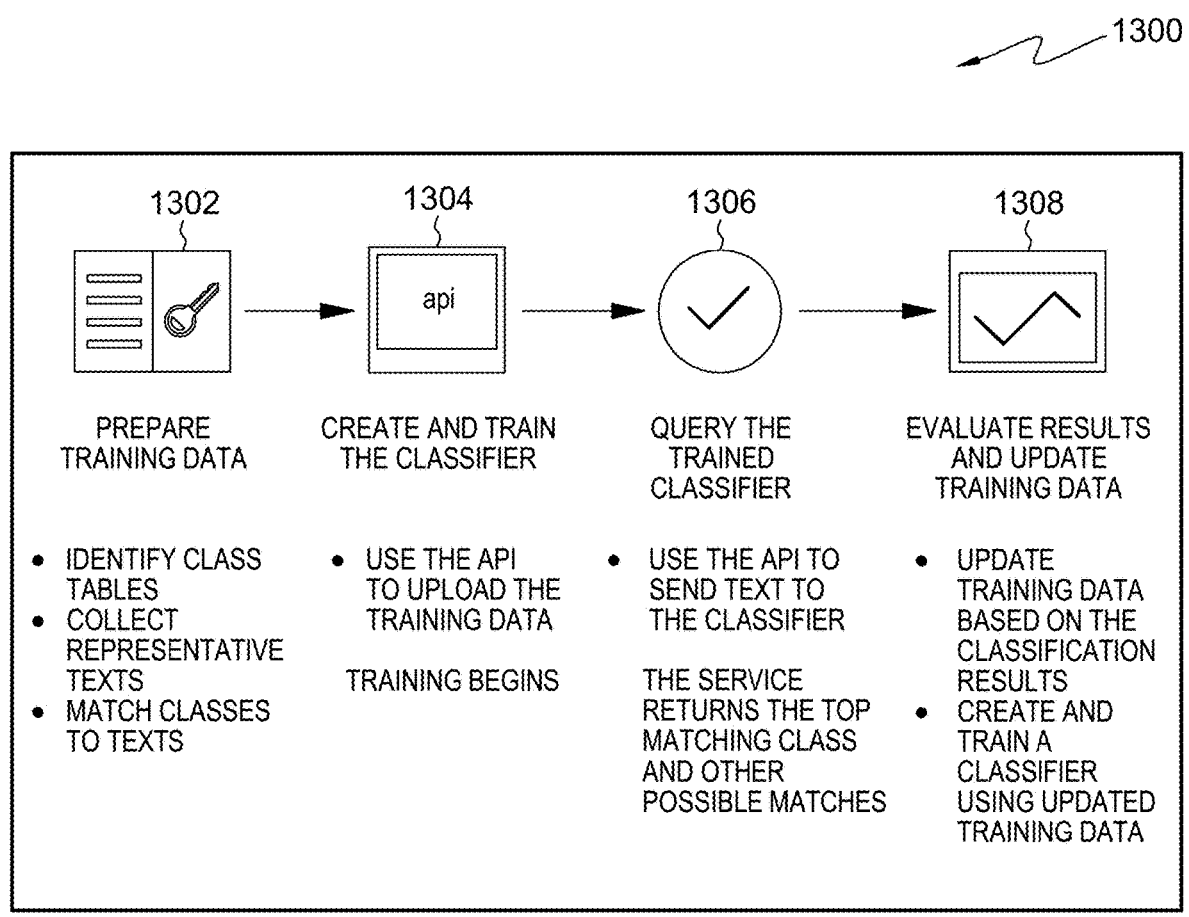
FIG. 13 depicts one example of creating and using a natural language classifier, in accordance with one or more aspects of the present disclosure.

FIG. 13 is a hybrid flow diagram 1300 of one example of an overview of the basic steps for creating and using a natural language classifier service. Initially, training data for machine learning is prepared, 1302, by identifying class tables, collecting representative texts and matching the classes to the representative texts. An API (Application Planning Interface) may then be used to create and train the classifier 1304 by, for example, using the API to upload training data. Training may begin at this point. After training, queries can be made to the trained natural language classifier, 1306. For example, the API may be used to send text to the classifier. The classifier service then returns the matching class, along with other possible matches. The results may then be evaluated and the training data updated, 1308, for example, by updating the training data based on the classification results. Another classifier can then be trained using the updated training data.

A data processing system, as described herein, can run a Natural Language Understanding (NLU) process for determining one or more NLU output parameter of a message. An NLU process can include, for example, one or more of a topic classification process that determines topics of messages and output one or more topic NLU output parameter, a sentiment analysis process which determines sentiment parameter for a message, e.g., polar sentiment NLU output parameters, "negative," "positive," and/or non-polar NLU output sentiment parameters, e.g., "anger," "disgust," "fear," "joy," and/or "sadness" or other classification process for output of one or more other NLU output parameters, e.g., one of more "social tendency" NLU output parameter or one or more "writing style" NLU output parameter.

By running an NLU process, the data processing system can perform a number of processes including one or more of (a) topic classification and output of one or more topic NLU output parameter for a received message (b) sentiment classification and output of one or more sentiment NLU output parameter for a received message or (c) other NLU classifications and output of one or more other NLU output parameter for the received message.

Topic analysis for topic classification and output of NLU output parameters can include topic segmentation to identify several topics within a message. Topic analysis can apply a variety of technologies, e.g., one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Certain embodiments herein may offer various technical computing advantages involving computing advantages to address problems arising in the realm of computer networks. Particularly, computer networks operating to provide real-time validation of electronic content, including adjusting weights applied to a user, which may include, for example, adjusting based on pre-rating user behaviors, a user rating history and/or a user credibility rating. Various decision data structures can be used to drive artificial intelligence (AI) decision making, such as a decision data structure that adjusts the weights for a user. In addition, a data structure can be used with respect to the adjusting. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a decentralized storage system such as a blockchain implementation, or any suitable combination of the foregoing. In the context of this document, a computer readable storage medium may be any tangible medium that can contain or store a program for use by or in connection with an instruction execution system, apparatus, or device.

Program code embodied on a computer readable storage medium may be transmitted using an appropriate medium, including but not limited to, wireless, wireline, optical fiber cable, Bluetooth, RF, etc., or any suitable combination of the foregoing.

Computer program code for carrying out operations for aspects of the present application may be written in any combination of one or more programming languages, including, for example, an object oriented programming language, such as, for example, JAVA, Smalltalk, C++ or the like, and conventional procedural programming languages, such as, for example, the "C" programming language, PHP programming language, Bash, HTML and/or JavaScript scripting languages, assembler or similar programming languages. The program code may execute, via one or more data processing systems, entirely locally, entirely remotely, a combination of locally and remotely. In the latter scenario, the remote data processing system may be connected to the user's computer through any type of network, including a local area network (LAN) or a wide area network (WAN), or the connection may be made to an external data processing system (for example, through the Internet using an Internet Service Provider).

Aspects may be described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a data processing system of a general purpose computer, special purpose computer, or other programmable data processing apparatus to produce a machine, such that the instructions, which execute via the data processing system of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a data processing system and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one data processing system coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, touch-screen based devices (e.g., laptop computers, mobile phones, tablets, smart watches, etc.), smart TVs, controllers for the TVs, set-top-box style streaming devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, Bluetooth, Wi-Fi, and Ethernet cards are just a few of the available types of network adapters.

The present application introduces the concept of Open News Validation. A neutral platform aggregates, crowdsources and provides all the tools and data people need to quickly check the facts on any news article for themselves. It then lets the public judge what is factual, thoughtfully-reported and unbiased—and what isn't—through the world's first news ratings platform. Users can rate any news story from any publisher for spin, trust, accuracy and relevance. Multiple AI algorithms cut through bias, weight credibility of raters, and provide validated news scores.

Figure 10:
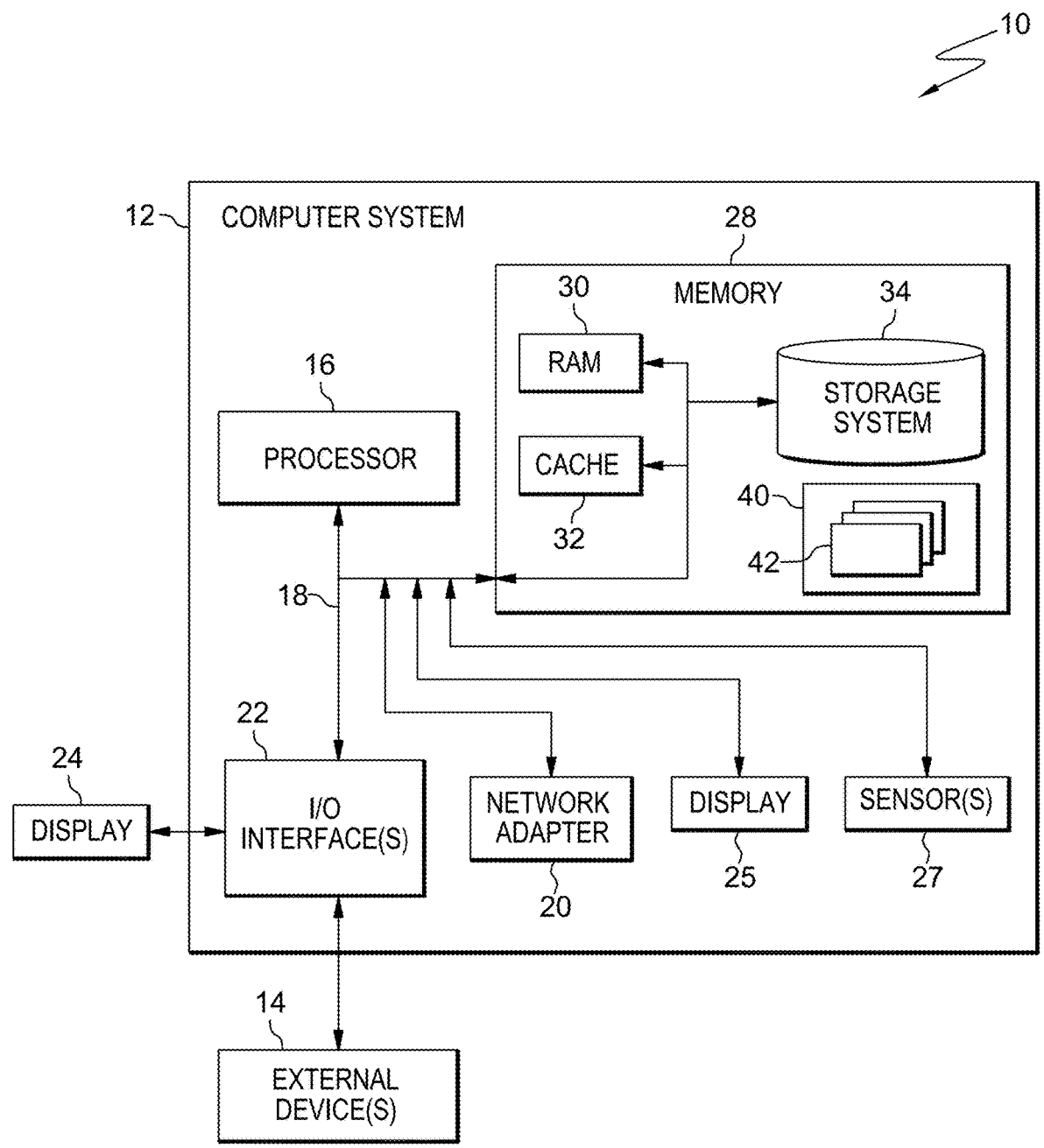
FIG. 10 is a block diagram of one example of a computer system, in accordance with one or more aspects of the present application.
Figure 11:
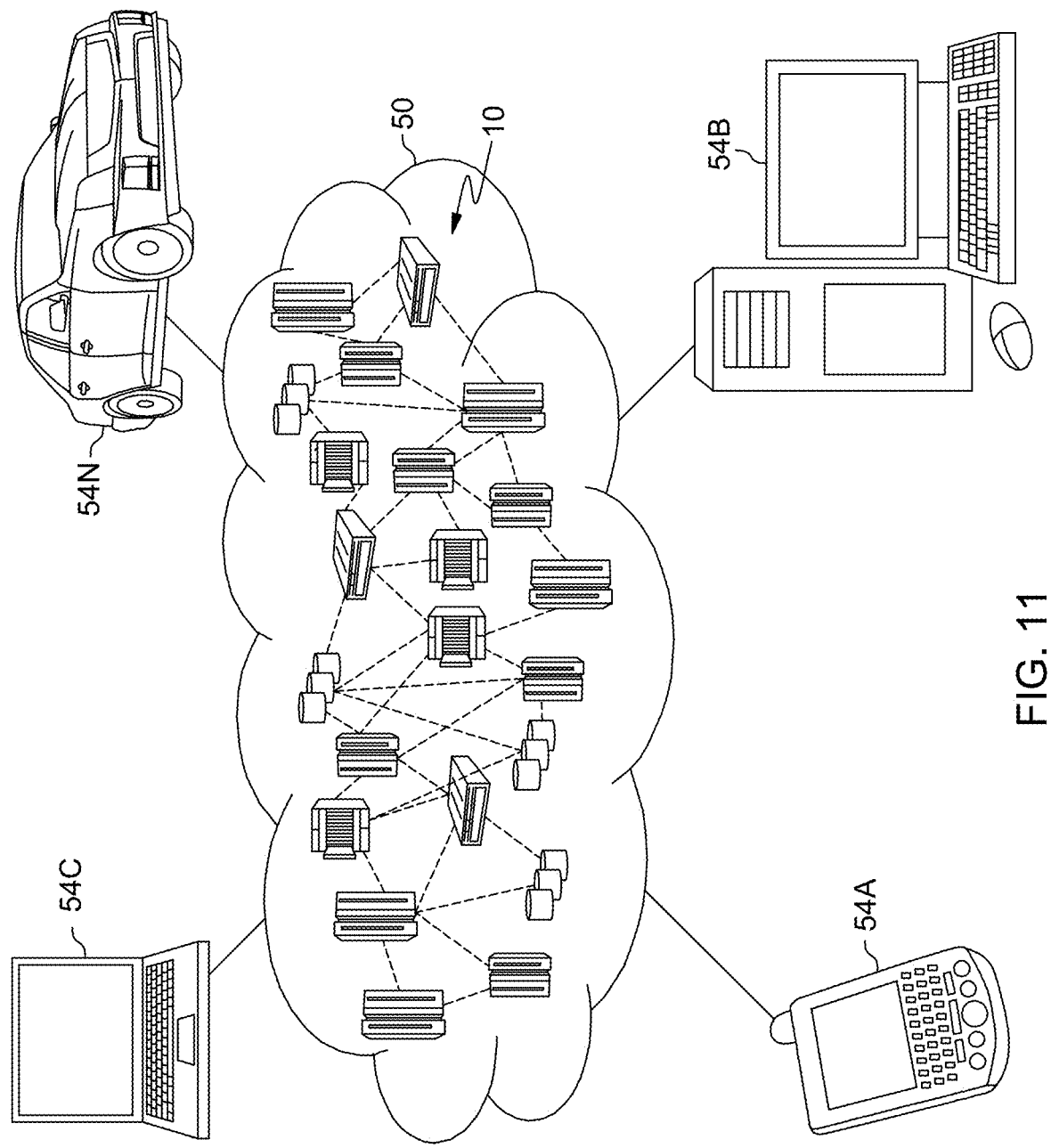
FIG. 11 is a block diagram of one example of a cloud computing environment, in accordance with one or more aspects of the present application.
Figure 12:
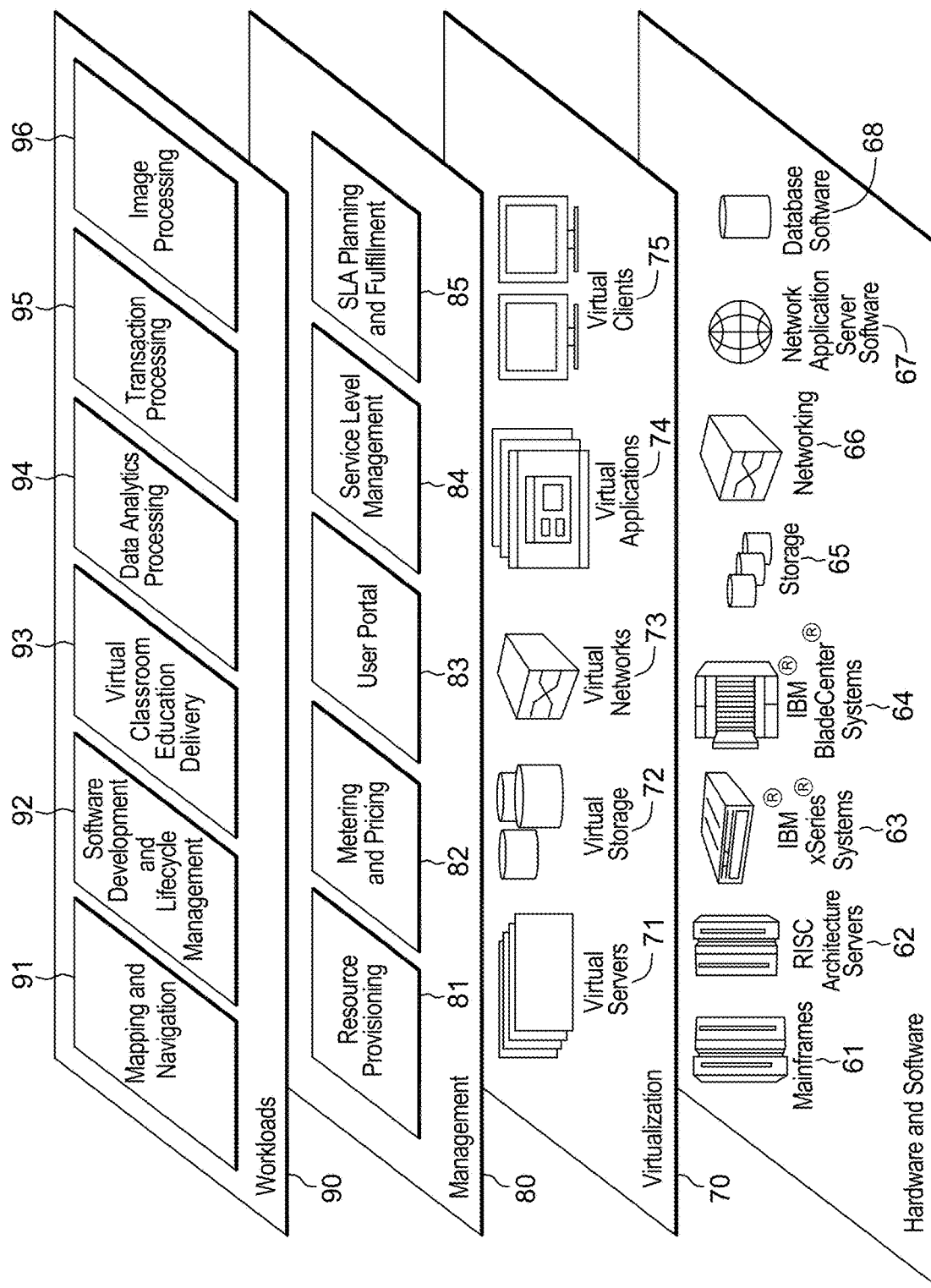
FIG. 12 is a block diagram of one example of functional abstraction layers of the cloud computing environment of FIG. 11, in accordance with one or more aspects of the present application.

FIGS. 10-12 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multi-data processing systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a computing device. The components of computer system 12 may include, but are not limited to, one or more data processing system 16, a system memory 28, and a bus 18 that couples various system components including system memory 28 to data processing system 16. In one embodiment, computing node 10 is a computing node of a non-cloud computing environment. In one embodiment, computing node 10 is a computing node of a cloud computing environment as set forth herein in connection with FIGS. 11-12.

Bus 18 represents one or more of any of several types of bus structures, including a memory bus or memory controller, a peripheral bus, an accelerated graphics port, and a data processing system or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18.

In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Referring now to FIG. 11, cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 10.

The present invention may be a system, a method, and/or a computer program product. The computer program product may include a computer readable storage medium (or media) having computer readable program instructions thereon for causing a data processing system to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a data processing system of a general purpose computer, special purpose computer, or other programmable data processing apparatus to produce a machine, such that the instructions, which execute via the data processing system of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer-implemented method of validating electronic content, the method comprising:
   providing, by a data processing system, electronic content to a plurality of users;
   rating, by at least some of the plurality of users, the electronic content, wherein said rating is enabled by offering a user a set of ratings amongst which a user could select, said set of ratings comprising spin, trust, accuracy and relevance;
   receiving, by the data processing system, the ratings of the electronic content from the at least some users of the plurality of users based on the one or more rating metrics, each rating being a raw rating having a default weight;
   adjusting, by the data processing system, the default weight for each raw rating based on pre-rating user behaviors, a user rating history, and a user credibility rating to arrive at an adjusted rating, wherein the user rating history comprises a frequency of a user rating the electronic content as each of the set of ratings from which the user can select;
   using, by the data processing system, the adjusted rating to arrive at a total rating; and
   making available to the plurality of users the total rating and one or more of each raw rating for the at least some of the users of the plurality of users and each adjusted rating for the at least some of the users of the plurality of users.

2. The computer-implemented method of claim 1, wherein the using comprises:
   determining, by the data processing system, a maximum possible rating for the electronic content;
   adding up, by the data processing system, all adjusted ratings and dividing by the maximum possible rating to arrive at a total rating; and
   storing, by the data processing system, the total rating in a database.

3. The computer-implemented method of claim 1, wherein one or more rating metrics comprises at least one of spin, trust, accuracy and relevance.

4. The computer-implemented method of claim 1, wherein the one or more pre-rating user behaviors comprises at least one of:
   whether the user has opened the electronic content;
   a length of time the user spent reading the electronic content;
   whether the user clicked on any source or related electronic content;
   a length of time the user spent reading the any source or related electronic content; and
   whether the user submitted any sources supporting or not supporting a portion or more of the electronic content.

5. The computer-implemented method of claim 1, wherein the one or more pre-rating user behaviors comprises whether the user submitted any source related to the electronic content.

6. The computer-implemented method of claim 1, wherein the electronic content has been rated by the at least some of the plurality of users as having one of left spin and right spin, and wherein if the user rating history includes more ratings than a predetermined minimum number, the default weight for each raw rating is adjusted based on user rating history wherein the user rating history comprises a frequency of rating the electronic content as one of true, false, left spin, right spin, trusted, distrusted, real, misleading, out of context, racial bias, non-sequitur, logical fallacy, speculation, generalization, misused, misinterpreted, sensational, doctored photo, doctored video and clickbait.

7. The computer-implemented method of claim 1, wherein the user credibility rating is based on user credibility factors provided by the user wherein the user credibility factors comprise at least one of uploading a profile photo of the user, linking one or more social media accounts of the user, allowing the public to see a real name of the user, verifying a phone number of the user, verifying a mailing address of the user, verifying a government issued ID of the user, and verifying an education of the user.

8. The computer-implemented method of claim 1, further comprising: displaying the total rating when the electronic content is open; and updating the total rating as additional ratings for the electronic content are received wherein the displaying the total rating is updated continually or periodically.

9. A computer-implemented method of rating users while the users are rating electronic content, the method comprising:
providing electronic content to a user for rating by the user, wherein the rating is based on one or more rating metrics; and
adjusting, by the data processing system, a preexisting or default user rating for the user based on:
a. one or more behaviors of the user prior to rating the electronic content, wherein the one or more behaviors are tracked;
b. user rating history; and
c. one or more user credibility factors;
wherein the user is rated while the user is rating content.

10. The computer-implemented method of claim 9, wherein the one or more rating metrics comprise at least one of left spin, right spin, trust, accuracy and relevance.

11. The computer-implemented method of claim 9, wherein the one or more pre-rating user behaviors comprises at least one of:
whether the user has opened the electronic content;
a length of time the user spent reading the electronic content;
whether the user clicked on any source or related electronic content;
a length of time the user spent reading the any source or related electronic content, and
whether the user submitted any sources supporting or not supporting a portion or more of the electronic content.

12. The computer-implemented method of claim 9, wherein the electronic content has been rated by at least some of the plurality of users as having one of left spin and right spin, and wherein if the user rating history includes more ratings than a predetermined minimum number, the default weight for each raw rating is adjusted based on user rating history wherein the user rating history comprises a frequency of rating the electronic content as one of true, false, left spin, right spin, trusted, distrusted, real, misleading, out of context, racial bias, non-sequitur, logical fallacy, speculation, generalization, misused, misinterpreted, sensational, doctored photo, doctored video and clickbait.

13. The computer-implemented method of claim 9, wherein the one or more user credibility factors comprise at least one of uploading a profile photo of the user, linking one or more social media accounts of the user, allowing the public to see a real name of the user, verifying a phone number of the user, verifying a physical mailing address of the user, verifying a government issued ID of the user, and verifying an education of the user.

14. A computer-implemented method, comprising:
receiving, by a data processing system, a raw rating from a user for electronic content based on one or more rating metrics wherein the one or more rating metrics comprise at least one of left spin, right spin, trust, accuracy and relevance and wherein for each of the rating metrics the user is offered a set of ratings amongst which the user could select;
querying, by the data processing system, a database for a rating history, based on the one or more rating metrics, for the user, wherein the data processing system comprises a data processing system in communication with a memory storing instructions for assisting the user in rating the electronic content and wherein the user rating history comprises a frequency of a user rating the electronic content as each of the set of ratings from which the user can select;
based on a number, type, and content of ratings for the user, determining, by the data processing system, a user bias;
based on prior user ratings, determining, by the data processing system, an article bias;
based on the article bias, comparing, by the data processing system, the user bias and the article bias;
determining, by the data processing system, a weight for the user based on user behavior;
adjusting, by the data processing system, the weight based on the comparing of the user bias and the article bias;
adjusting, by the data processing system, the weight based on user credibility factors; and
storing, by the data processing system, the weight in a database.

15. A system for validating electronic content, the system comprising:
at least one processor; and
a memory in communication with the at least one processor, the memory storing instructions implementing a method of validating electronic content, the method comprising:
providing, by a data processing system comprising the at least one processor and the memory, electronic content to a plurality of users;
rating, by at least some of the plurality of users, the electronic content wherein the users are provided with a set of ratings metrics comprising spin, trust, accuracy and relevance, and ratings values from which to select for each of the rating metrics;
receiving, by the data processing system, the ratings of the electronic content from the least some users of the plurality of users based on the one or more rating metrics, each rating being a raw rating having a default weight;
adjusting, by the data processing system, the default weight for each raw rating based on pre-rating user behaviors, a user rating history, and a user credibility rating to arrive at an adjusted rating wherein the user ratings history comprises a frequency of a user rating the electronic content as each of the ratings values from which the user can select;
using, by the data processing system, the adjusted rating to arrive at a total rating; and
making available to the plurality of users the total rating and one or more of each raw rating for the at least some of the users of the plurality of users and each adjusted rating for the at least some of the users of the plurality of users.

16. The system of claim 15, wherein one or more rating metrics comprises at least one of left spin, right spin, trust, accuracy and relevance.

17. The system of claim 15, wherein one or more pre-rating user behaviors comprises at least one of:
whether the user has opened the electronic content;
a length of time the user spent reading the electronic content;
whether the user clicked on any source or related electronic content; and
a length of time the user spent reading the any source or related electronic content; and
whether the user submitted any sources supporting or not supporting a portion or more of the electronic content.

18. The system of claim 15, wherein the one or more pre-rating user behaviors comprises whether a given user of the at least some users submitted any source related to the electronic content.

19. The system of claim 15, wherein the electronic content has been rated by the at least some of the plurality of users as having one of left spin and right spin, and wherein the user rating history comprises a frequency of the ratings values comprising true, false, left spin, right spin, trusted, distrusted, real, misleading, out of context, racial bias, non-sequitur, logical fallacy, speculation, generalization, misused, misinterpreted, sensational, doctored photo, doctored video and clickbait.

20. The system of claim 15, wherein the user credibility rating is based on user credibility factors provided by the user wherein the user credibility factors comprise at least one of uploading a profile photo of the user, linking one or more social media accounts of the user, allowing the public to see a real name of the user, verifying a phone number of the user, verifying a physical mailing address of the user, verifying a government issued ID of the user, and verifying an education of the user.

* * * * *